Dec. 12, 1961 F. PAPKE 3,012,464
MEASURING FINDER FOR PHOTOGRAPHIC PURPOSES
Filed June 27, 1958 4 Sheets-Sheet 1

INVENTOR
FRIEDRICH PAPKE

BY
ATTORNEYS

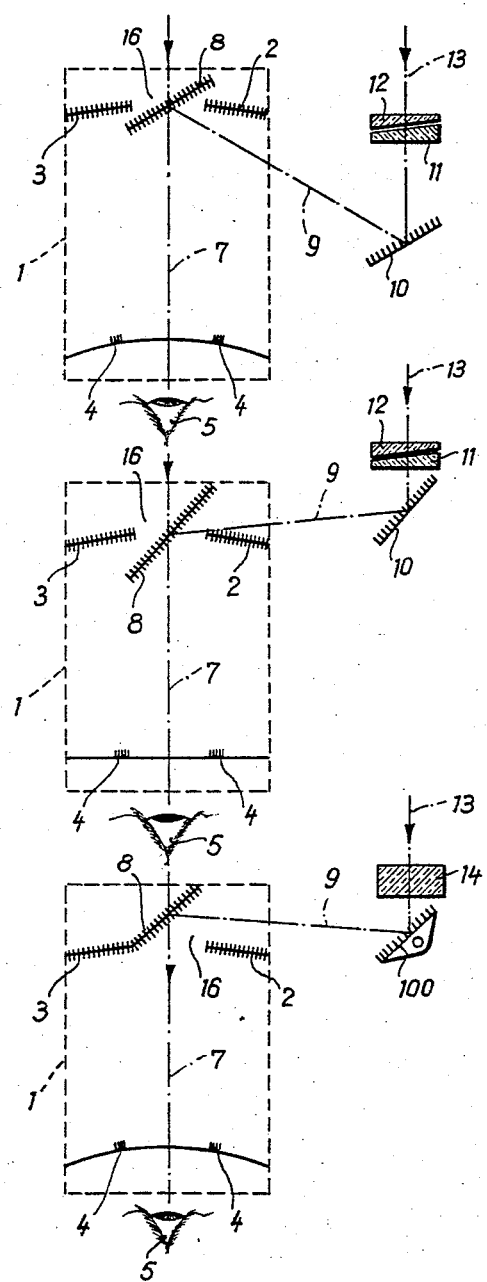

Dec. 12, 1961     F. PAPKE     3,012,464
MEASURING FINDER FOR PHOTOGRAPHIC PURPOSES
Filed June 27, 1958     4 Sheets-Sheet 3

INVENTOR
FRIEDRICH PAPKE
BY
ATTORNEYS

Dec. 12, 1961  F. PAPKE  3,012,464
MEASURING FINDER FOR PHOTOGRAPHIC PURPOSES
Filed June 27, 1958  4 Sheets-Sheet 4
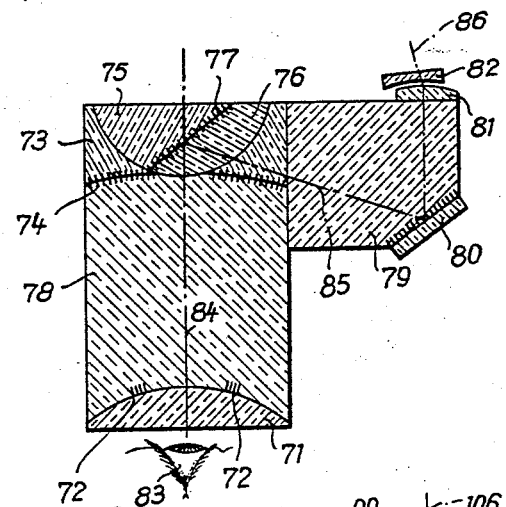
INVENTOR
FRIEDRICH PAPKE 3,012,464
MEASURING FINDER FOR PHOTOGRAPHIC
PURPOSES
Friedrich Papke, Braunschweig, Germany, assignor to Voigtlander A.G., Braunschweig, Germany, a corporation of Germany
Filed June 27, 1958, Ser. No. 745,090
Claims priority, application Germany Mar. 12, 1958
15 Claims. (Cl. 88—2.4)

This invention relates to a measuring finder, in which a base range viewfinder, is combined with a finder and it has particular relation to measuring finders of this type in which the finder is constructed in accordance with the so-called Albada principle, in which the operator's eye observes a luminous framing of the image field. This advantage is utilized, according to the present invention, in a view finder-range finder-combination with common insight, i.e. in a measuring finder.

Albada finders have certain peculiarities which, in themselves, at first appear to be harmful to such combination with a base range finder, and the elimination of such difficulties and disadvantages required the exercise of creative faculty. The Albada finder includes a curved, partially permeable mirror, through which the image is observed by the eye. Arranged in about the focal plane of this mirror is the frame to be reflected, which forms the boundary of the image field and usually consists of a reflecting rectangle deposited by vaporization on the ocular of the finder or on another suitable part of finder assembly. This frame is imaged by the beforementioned partially permeable mirror at substantially infinity so that it appears freely and luminously in space and can be readily observed by the eye. The particular difficulties in such finders are due to the loss of light caused by the beforementioned partially permeable concave mirror, and this impairment affects the brightness of the frame to be reflected. This situation is not improved, but is rather made worse, if the Albada finder is assembled with a range finder.

It has been repeatedly suggested previously to combine a base range finder with an Albada finder. Thus it has been suggested to arrange an Albada finder behind or in front of the range finder and it has been also suggested to use constructions in which the range finder is nested within the specific elements of an Albada finder. It has further been suggested to render the surface for reflecting the meausring ray partially permeable or fully reflective and attempts have also been made to interrupt the semi-permeable mirror coating of the Albada finder. However, in the constructions according to these prior suggestions various difficulties have been encountered and these suggestions did not result in satisfactory combinations of a base range finder with an Albada finder.

It is a main object of the present invention to overcome these difficulties in the following manner.

According to the invention, the beam splitter of the range finder, which is inclined relative to the axis of the viewfinder and has hitherto usually been arranged about mid-way between the vertex of the ocular and the vertex of the semi-permeable concave mirror of the Albada view finder, is shifted toward the outlook of the view finder to such an extent that its distance from the partially light permeable concave mirror of the view finder is distinctly less than ½ of the focal length of this mirror. Simultaneously with this step, the known interruption of the mirror surface is provided for and this interruption is dimensioned in such a manner that only a partially permeable mirror surface is located in the normal line of sight.

As compared to prior constructions of this general type, the measuring finder according to the invention makes it practical to reduce the partially light permeable viewing surfaces to a single partially light permeable viewing surface. This is due to the fact that the repositioning of the beam splitter of the range finder within the Albada finder renders the measuring finder highly independent of the position of the operator's eye, so that there is no trouble even if the position of the pupil is perceptibly abaxial. A further advantage is that the frame can be seen as clearly as in Albada finders which have no built-in range finder.

In further accordance with the present invention, it has been found advantageous, from the practical standpoint, to shift the beam splitter of the range finder even further in the direction toward the partially light permeable mirror of the viewfinder so that the distance from the vertex of this mirror to the beam splitter amounts to only about ⅕ of the focal length of the mirror, or even less than this. In this case, the beam splitter is incorporated in a separate member of transparent material, preferably a lens, and this lens has mating engagement with the concave surface bearing the partially permeable mirror at at least that part thereof which is not provided with a mirror coating. The lens may be a two-part lens with the beam splitter incorporated in the cemented surface joining the two parts.

Furthermore, very favorable results are attained if the intersection of the optical axis of the viewfinder with the beam splitter is at substantially the vertex of the concave mirror of the viewfinder, whereby the spacing of the beam splitter from the concave mirror amounts to substantially zero. In this arrangement, a part of the beam splitter would necessarily project into the space occupied by the object or front lens of the Albada finder. For this purpose, the front lens may be formed with a recess opening through its front surface and which intersects the concave mirrored surface at the portion thereof which is not provided with a mirror. This recess receives a transparent member which mates therewith and preferably has the shape of the lens, this transparent member being divided and carrying the beam splitter in its cemented interface.

In a modified form of the invention, the intersection of the beam splitter with the optical axis of the viewfinder is located, considering the direction of view, beyond the vertex of the concave mirror. This modification has certain structural advantages with respect to the arrangement of the transparent member of the range finder forming a path for the range finder rays.

At this point, it should be stated that the principles of the invention are applicable equally to Albada finders of the so-called "open" type in which the several elements are merely mounted in a carrying frame, and to Albada finders of the so-called "block" type in which all of the optical elements are cemented to form an integral unit.

While it has been customary hitherto to position the beam splitter at an angle of substantially 45 degrees to the optical axis of the viewfinder, in accordance with the present invention, the beam splitter may be positioned at an angle quite substantially different from 45 degrees, and preferably at an angle of about 27.5 degrees. In such case, the path of the light rays reaching the optical axis of the viewfinder is not perpendicular thereto but is inclined. However, this has no adverse effect on the measuring finder and even has the advantage that a compact design of the entire instrument is thereby made possible. A further advantage of utilizing an angle of substantially less than 45 degrees is that polarisation of the light during passage and in reflection at the interface is very considerably reduced, so that nonabsorbing multiple layers can be used to provide the partially permeable metalization of the beam splitter. As a result, not only is the intensity of the light reaching the eye improved but also the contrast is essentially improved.

As mentioned above, it is of particular importance to carry out the construction of measuring finders of the type here in question in such a manner that the use of the instrument be rather independent from the pupil position of the operator. Even at abaxial insight, the recess in the partially permeable mirror layer of the concave surface in the objective of the Albada finder should not give rise to partial or complete fading of the measuring image or of the frame to be reflected and thus to uncertainty in adjustment. For this purpose, the beam splitter is preferably so constructed and positioned that its ends, and particularly the end more remote from the concave mirror of the viewfinder, somewhat overlap the edges of the non-mirrored portion of the viewfinder mirror. While this results in a small zone in which the light intensity is somewhat reduced due to the light rays passing through two partially permeable mirror surfaces, the zone is so small that it has no perceptible adverse effect on the viewer and, in any event, the advantages of avoiding adverse parallax phenomena outweigh any disadvantages due to this imperceptible reduction in light intensity. Furthermore, the beam splitter can have one end terminating at one edge of the non-mirrored recess if the other end of the beamsplitter, which is outwardly of the concave mirror, overlaps the other edge of such recess. The result of this arrangement is that inadvertent looking into the viewfinder along a line oblique to the optical axis thereof does not have any practical effect on the clarity of the image. A further advantage of this arrangement resides in the provision of a semi-permeable mirror surface extending completely across the viewfinder. This is effected by connecting the outer end or edge of the beam splitter to the adjacent edge of the recess in the concave mirror by a partially light permeable surface.

Depending upon the position of the beam splitter within the viewfinder, and also on its orientation relative to the optical axis of the latter, the path of the light rays entering through the range finder will be more or less inclined rather than perpendicular to the optical axis of the viewfinder. This necessitates that the reflecting mirror of the range finder have a relative orientation such as to properly direct the light ray for the indirect image to the beam splitter. With respect to the longitudinal extent of the viewfinder, this reflecting mirror is disposed laterally thereof and either in the general longitudinal zone of the front lens of the viewfinder or the general longitudinal zone of the ocular or eye-piece of the viewfinder.

Albada viewfinders of the block type are particularly of advantage for use in the present invention as, in such finders, the light rays reaching the viewfinder from the range finder will pass entirely through solid transparent material, such as glass. Accordingly, in the present invention an additional block of transparent material, such as glass, extends laterally from the block type viewfinder and supports the range finder reflecting mirror and, if desired, other optical elements, such as wedges or the like, for distance measuring. This laterally extending block forms an integral unit with the block type viewfinder, as by being cemented to the intermediate block of the latter. With proper positioning of the beam splitter, the path of the light rays of the range finder lies completely outwardly of the concave mirror of the viewfinder, considered in the viewing direction therethrough.

The manufacturing cost of measuring finders embodying the invention can be substantially reduced, and their production simplified, if all cemented surfaces except those carrying mirror means are merely ground but not polished to optical standards, and if such surfaces are then connected by means of a cement which has about the same index of refraction as the joined transparent parts. While glass is a usable material for the measuring finder of the present invention, the latter may be formed of material other than glass, such as transparent synthetic material.

Also, a particularly advantageous arrangement is provided if the non-mirrored recess in the viewfinder concave mirror has an elongated shape, such as an elliptic shape.

For an understanding of the principles of the invention, reference is made to the following description of typical embodiments thereof as illustrated in the accompanying drawings. In the drawings:

FIGS. 1 through 6 are diagrammatic illustrations of measuring finders embodying the invention, and showing different preferred positionings and orientations of the beam splitter of the range finder within the viewfinder;

Figure 9:
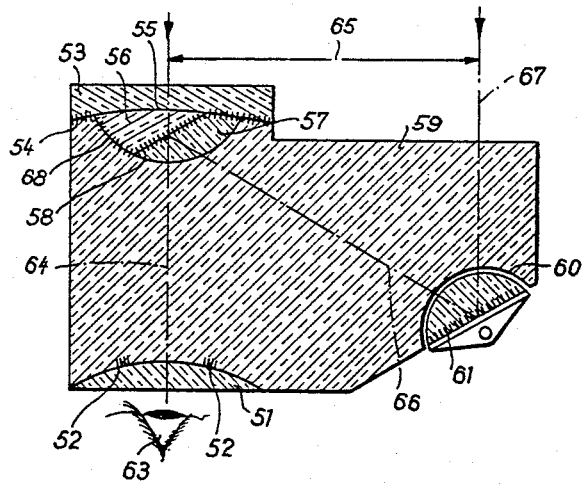

FIGS. 9, 10, and 11 are horizontal sectional views through block type measuring finders embodying the invention; and FIG. 12 is a horizontal sectional view through an "open" type of measuring finder embodying the present invention.

The measuring finder arrangements diagrammatically illustrated in FIGS. 1 through 6 are applicable to either block type or open type finders. In these figures, in which the same reference numerals designate like or corresponding parts, the optical elements have been shown in outline for the sake of clear and simple illustration. In an open type finder, these optical elements would be powerless menisci, while in a block type finder they would be lenses cemented to an intermediate block of transparent material.

Figure 1:
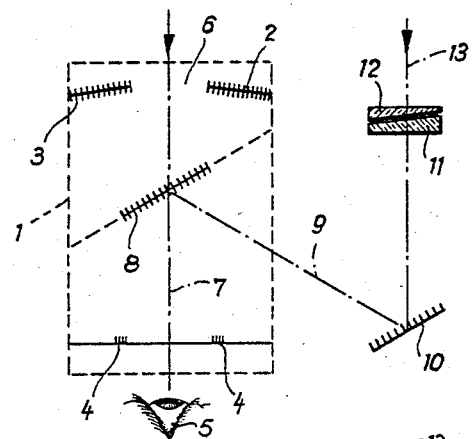

Referring to FIG. 1, the body of an Albada finder is indicated at 1 as including a front member 2 carrying the partially permeable concave mirror 3. The picture limiting frame is indicated at 4, and the viewer's eye at 6. Mirror 3 has a gap or interruption therein as indicated at 6, this gap or interruption being preferably centered on the optical axis 7. The range finder beam splitter 8 is positioned on this optical axis and has incident thereon light rays reaching it along a path 9. These light rays enter through an Abat wedge 11, 12, along an optical axis 13 and are reflected from a mirror, or other equivalent optical element or surface, 10. The light rays passing along the lines 13 and 9 provide the indirect image of the object, whereas those passing along the object 7 provide the direct image of the object.

In the embodiment illustrated in FIG. 1, the inclined beam splitter 8 of the range finder is centered on the optical axis 7 of the Albada finder near its partially permeable concave mirror 3, and at a distance from the latter which is smaller than ½ of its focal length. In the specific case illustrated, the distance is about ⅔ of this focal length. This beam splitter 8 is arranged in front of the beforementioned concave mirror, without being connected thereto. Its orientation clearly deviates from an inclination of 45° relative to the optical axis 7 i.e. it is at an angle of substantially more than 45 degrees to optical axis 7. The left edge of beam splitter 8 overlaps, as shown, the left inner edge of zone 6, which forms a gap in the mirror coating of the concave mirror. Ray 9 extends along a line which is considerably inclined relative to the range finder base which is perpendicular to axis 7.

Figure 2:
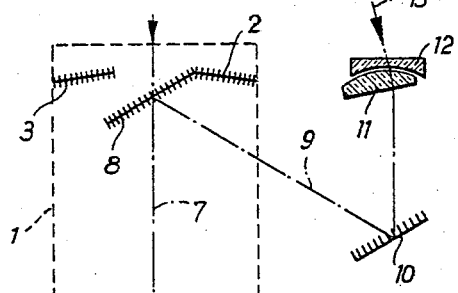

In the embodiment according to FIG. 2, the right edge, in the drawing, of beam splitter 8 directly joins the right portion of the partially mirror-coated concave surface 3 of the Albada finder. In this case, also, beam splitter 8 projects to the left somewhat beyond the non-mirrored gap of mirror 3. Thus, the position of beam splitter 8 is shifted still more along optical axis 7 toward the concave surface 3 of the finder, as compared with the case illustrated in FIG. 1.

Figure 3:
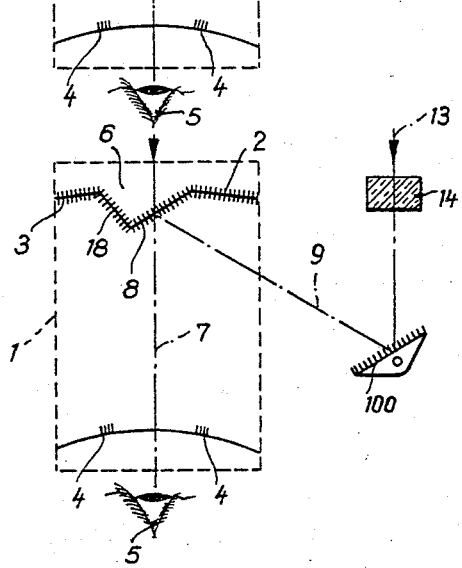

FIGURE 3 illustrates an embodiment in which, by junction of partially permeable layer 8 for reflecting the range finder ray 9 to the partially permeable mirror layer 3, reflection of frame 4 is still further improved in this embodiment, the right edge of beam splitter 8, as viewed in the drawing, directly joins the right edge of the gap 6 in the partially permeable mirror 6. However, the left end of beam splitter does not project beyond the left edge of recess 6 and is somewhat short thereof. The left edge of beam splitter 8 is joined to the left portion of mirror surface 3 by an additional semi-permeable mirror surface 18. Moreover, FIG. 3 indicates that the design of the range finder proper may be of any desired type. In FIG. 3, by way of example, mirror 100 is shown as a pivoted member and 14 is a prism, or the like.

FIGURE 4 illustrates an embodiment in which beam splitter 8 is shifted along the optical axis of the Albada finder, toward the front surface of the finder, to such an extent that its point of intersection with optical axis 7 approximately coincides with the vertex of the partially mirror coated concave surface 3. This means that the distance of beam splitter 8 from this vertex is zero. As shown in FIG. 4, the beam splitter 8 extends into front element 2. In order to render this possible, this member 2 must be formed, in the range of the uncoated zone, with a cut-out 16. Beam splitter 8 is again arranged at an angle of less than 45 degrees to the optical axis 7, so that, in this case also the ray path through the range finder slopes downwardly as viewed in the drawing. The set back left edge of beam splitter 8 is, as indicated, sufficiently long in order to overlap a small portion of the partially permeable mirror coating 3 in the viewing direction. However, in this connection the same arrangement as shown in the left part of FIG. 3, also could be used.

The embodiment illustrated in FIG. 5 is similar to that shown in FIG. 4. However, in FIG. 5 the beam splitter 8 forms an angle of about 45° with the optical axis of the Albada finder. As a consequence of this arrangement, ray 9 of the range finder extends about perpendicularly to the optical axis of the finder and thus outwardly of the curved surface of the concave mirror 3 of the Albada finder.

FIGURE 6 illustrates an embodiment which is similar to that of FIG. 5. However, in FIG. 6 the beam splitter 8 of the range finder is shifted still more in the direction of the front surface of the finder so that its point of intersection with the optical axis 7 is located outside the partially mirror-coated concave surface 3.

In the measuring finders shown in FIGS. 7 through 11, there are utilized Albada finders which are of the block construction type. Accordingly, between the ocular and the objective of the finder of such constructions, a block, which consists of glass or a synthetic plastic, is arranged, due to the presence of which, the finder, as a whole, can be conveniently and easily built-in into a camera. In the embodiment shown in FIGS. 7, 9, 10, and 11, an additional block of transparent material is cemented to and extends laterally from the block type Albada finder proper, or from the objective lens of the latter. This additional block can also be made integral with the intermediate block of the Albada finder or with the front lens thereof. The laterally extending block encloses the base of the range finder, whose light rays pass therethrough.

Figure 7:
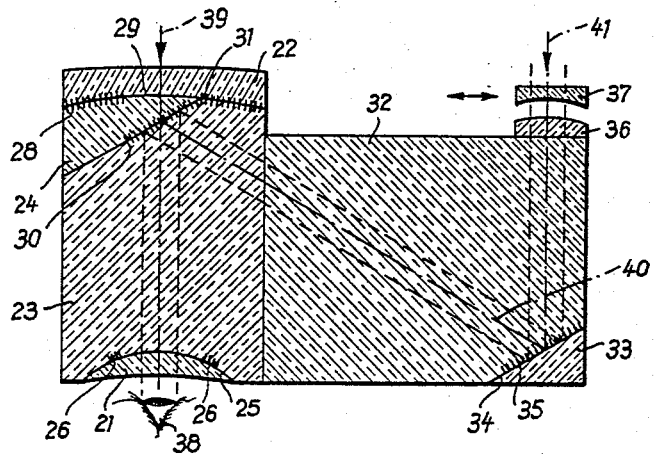
FIG. 7 is a horizontal sectional view through a measuring finder embodying the invention.

In FIG. 7, reference symbol 21 denotes the rear part and 22 the front part of the Albada finder. These parts are connected by an intermediate glass block (which can be made also of a synthetic plastic) and this block consists of parts 23 and 24. The frame 26 is applied to the convex surface 25 of rear part 21, preferably by deposition from the vapor phase under vacuum. The partially permeable mirror 28, which has a non-mirrored gap 29 therein, is disposed in the cemented interface between lock part 24 and lens 22. The inclined cemented interface between block parts 23 and 24 carries the beam splitter 30 of the range finder. Beam splitter 30 adjoins at 31 the inner edge of gap 29, so that on this side of the finder there is no interruption or only a slight interruption of the partially permeable mirror coating. The above-mentioned block 32 of the range finder is cemented to and extends laterally from the block member 23. It has an inclined cemented surface 34, in which mirror 35 of the range finder is located. Reference symbol 36 denotes a lens which is fixedly connected with block 32 and forms, together with the displaceable lens 37, the optical micrometer for measuring the distance. The operator's eye is indicated at 38, the optical axis of the Albada finder at 39, the course of the ray in the range finder at 40 and the measuring ray at 41. For the sake of better understanding, the beam of rays is shown merely diagrammatically, in order to indicate the path of rays of the range finder. The beam splitter 30 projects noticeably beyond the left inner edge of gap 29 in the partially permeable finder mirror, so that, upon looking in a non-axial direction through the viewfinder, there is no danger of a disappearance of the range finder image from the field of view.

Figure 8:
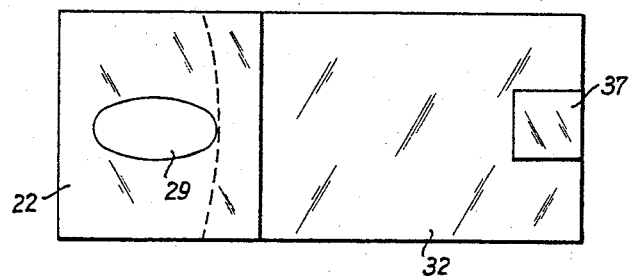
FIG. 8 is an elevational view of the objective side of the range finder shown in FIG. 7.

As shown in FIG. 8, the gap 29 in the partially permeable mirror 28 of the Albada finder is neither rectangular nor circular, but of elongated shape, e.g. of approximately elliptical shape in the example shown. Gap 29 also could be made with angular corners, i.e. it could have the shape of a rhombus. However, the elliptical form has been found to be favorable with respect to location of the eye, and also with regard to manufacture.

The measuring finder illustrated in FIG. 9 has an eye lens 51, which carries the frame 52 to be reflected. The front lens 53 carries, on its concave surface 54 the partially permeable mirror having a gap 55. In this case, there is cemented to the concave surface 54, 55 a lens, which is sub-divided into parts 56 and 57. This lens carries, in its cemented interface the beam splitter 58 of the range finder. The intermediate glass block 59 is designed in this case in such a manner that it projects considerably in a lateral direction beyond the Albada finder proper, and thus has the range finder ray 66 extending therethrough. In this case, in the same manner as shown in FIG. 7, block 59 is positioned nearer to the eye side of the measuring finder; it may be flush with the rear surface of the instrument, if desired. The block 59 is recessed at the lower part of its right end at 60, as viewed in FIG. 9, so that the adjustable mirror 61 for distance measuring can be arranged therein. The eye is shown at 63, the optical axis of the finder at 64, the base of the range finder at 65 and the measuring ray at 67. In this embodiment, to an even greater extent than in the embodiment shown in FIG. 7, when the viewer looks in a non-axial direction into the finder, there is no possibility for the eye to observe a non-reflected surface. For this purpose, the partially permeable mirror-coated surface 68 of the lens member 56 joins the left end of the beam splitter 58 with the partially mirror-coated left zone of the concave mirror 54.

In the embodiment illustrated in FIG. 10—in a manner similar to that shown in FIG. 6—the point of intersection of the optical axis of the Albada finder with the beam splitter 77 of the range finder is located outside the concave mirror 74 and the course 85 of the ray of the range finder extends through the lens 73 outwardly of the concave mirror 74. The rear member 71 provided with the frame 72 deposited thereon is here located opposite the front lens 73 which carries the partially permeable concave mirror 74 of the Albada finder on its spherically curved inner surface. These two optical members of the finder are connected with the glass block 78 by cementing. In the range of the gap in the partially permeable mirror coating 74, the front lens 73 is provided with a recess in the shape of a strongly curved spherical lens. This recess is filled with a hemi-spherically shaped glass part which consists of two parts 75, 76, and the beam splitter 77 of the range finder is arranged in the cemented interface of parts 75, 76. The laterally projecting block 79 of the range finder is cemented to the intermediate block 78 and the objective part 73, and is positioned closer to the front side of the measuring finder and it is flush with the outer surface of front part 73 of the finder. A part 80 is cemented to the block 79, and the non-movable mirror surface of the range finder, in this embodiment, is arranged in the cemented interface between part 80 and block 79. Reference symbols 81 and 82 indicate an optical wedge for distance measuring. 83 indicates the eye, 84 the optical axis of the finder, 85 the path of rays of the range finder and 86 the measuring ray.

FIGURE 11 illustrates a modification of the construction shown in FIG. 10. The rear member 91, which carries the frame 92 to be reflected, is cemented to intermediate block 95 of glass or synthetic material, and block 95 is, in turn, cemented to front member 93 carrying the partially permeable mirror 94. The front lens 93 is provided with a recess of hemi-spherical shape, which is filled by a lens consisting of the two parts 96 and 97. In this case, lens 96, 97 also projects somewhat into the correspondingly recessed intermediate block 95. The beam splitter 98 of the range finder is positioned in the cemented interface of parts 96, 97, and the point of intersection of this beam splitter with the optical axis of the finder is located approximately at the vertex of the concave surface 94. It is contemplated that—like in the example shown in FIG. 10—the range finder base be located outside the mirror-coated concave surface 94 of the finder front lens 93 and, in order to attain this, the beam splitter 98 is arranged here with an inclination of about 45°. The laterally cemented glass block 200 is arranged flush with the front surface of the front lens 93 of the finder. It is provided with a recess 102 adapted to receive the tiltable measuring mirror 101, in a manner similar to that shown in FIG. 9. The operator's eye is indicated at 104, the optical axis of the Albada finder at 105, the course of the rays at 99 and the measuring ray of the range finder at 106.

FIGURE 12 diagrammatically illustrates a measuring finder which is constructed without the use of an intermediate glass block. The eye lens 201 consists here of a powerless meniscus. This lens carries the image field frame 202 deposited from vapor phase. The outlook lens 205 of the Albada finder is arranged in the casing 204 opposite to the frame and separated therefrom by an airspace. This lens is likewise a meniscus 205 which is provided with a recess 207 adapted to receive the beam splitter 208 of the range finder. Beam splitter 208 is cemented to the edge of recess 207, which is of elliptic shape as shown in FIG. 8, and is held in position in this manner. The adjustable mirror 210 of the range finder and the cover glass plate 211 are arranged in the annex 209 of casing 204 of the range finder. The viewing eye is indicated at 212, the optical axis of the finder at 213, the course of rays of the range finder at 214 and the measuring ray at 215. Reference symbol 216 indicates a plane parallel glass plate of the finder, which forms a cover in the direction of the object. In the example shown in FIG. 12 the lateral annex 209 is arranged at the middle portion of the finder.

It will be understood from the above that this invention is not limited to the specific elements, designs, combinations, constructions and other details specifically described above and illustrated in the drawings and can be carried out with various modifications without departing from the scope of the invention as defined in the appended claims.

Under "powerless menisci" is to be understood that its refractive power is close to zero diopters and preferably smaller than +1.0 dptr. in the positive direction and also smaller than −1.0 dptr. in the direction of the residual negative refractive power.

Under "slowly receding density of metalization" is to be understood such a kind of metalization on the light-permeable carrier, that a zone of conventional mirror coating is applied which bears no sharp bordering but continues in radial direction in a layer of continuously diminishing thickness, which results in a likewise diminishing mirror effect.

What is claimed is:

1. A combined base range finder and Albada type viewfinder unit, for mounting in photographic cameras, comprising, in combination, a front viewfinder optical element having a spherically concave inner surface; forming a partially light permeable mirror having a non-mirrored gap area substantially centered on the optical axis of the viewfinder; a rear viewfinder optical element spaced axially from said front element and having an image limiting frame on its inner surface facing said mirror; the axial spacing of said front and rear elements being such that said frame is located at substantially the focal plane of said mirror for imaging said frame by said mirror at substantially infinity; a partially light permeable mirror means, for reflecting the range finder rays through said rear element, positioned on the optical axis of the viewfinder at an acute angle to said axis and facing said frame; means forming a fully reflecting mirrored surface included in the range finder and spaced laterally of the optical axis of the viewfinder for directing the indirect image rays entering the range finder to said mirror means for reflecting through said rear optical element; and optical means, including a movable element, incorporated in the range finder, for directing the indirect image rays to said fully reflecting mirrored surface for effecting coincidence of the direct and indirect images by adjustment of said movable element and for effecting measurement of the distance by reference to the adjusted position of said movable element; at least one edge of said mirror means joining said partially light permeable mirror at an edge of said non-mirrored gap area; the relative positions and extent of said gap area and said mirror means being such that light rays forming either the direct or indirect image pass through only one of said partially light permeable mirror and said mirror means.

2. A combined base range finder and Albada viewfinder unit as claimed in claim 1 in which only one edge of said mirror means is joined to said partially permeable mirror at an edge of said non-mirrored gap area.

3. A combined base range finder and Albada type of viewfinder unit as claimed in claim 2 in which said one edge of said mirror means is the edge of the later nearest to the outer surface of said front optical element.

4. A combined base range finder and Albada type viewfinder unit as claimed in claim 2 in which said one edge of said mirror means is the edge of the latter further from the outer face of said front optical element.

5. A combined base range finder and Albada type viewfinder unit as claimed in claim 2 including a partially light permeable mirrored surface joining the opposite edge of said mirror means to an edge of said non-mirrored gap area and facing said rear optical element.

6. A combined base range finder and Albada type viewfinder unit as claimed in claim 1 in which said mirror means extends across said partially light permeable mirror.

7. A combined base range finder and Albada type viewfinder unit as claimed in claim 1, in which the point of intersection of the beam splitter with the optical axis of the viewfinder approximately coincides with the vertex of the partially light permeable mirror of the Albada finder.

8. A combined base range finder and Albada type viewfinder unit as claimed in claim 1 in which the reflecting surface of said mirror means is at an acute angle to the optical axis of the viewfinder other than 45 degrees.

9. A combined base range finder and Albada type viewfinder unit as claimed in claim 8 in which the angle between said mirror means and the optical axis of the viewfinder is substantially 27.5 degrees.

10. A combined base range finder and Albada type viewfinder unit as claimed in claim 1 in which said mirror means is incorporated in a lens having part of its surface carrying a partially permeable mirror coating connecting the edge of said mirror means nearer said rear optical element to an edge of said gap area.

11. A combined base range finder and Albada type viewfinder unit as claimed in claim 1 in which the front optical element has an aperture therethrough; a mating glass member fitted in said aperture; said mirror means being incorporated within said glass member.

12. A combined base range finder and Albada type viewfinder unit as claimed in claim 11 in which the glass member consists of a lens which extends up to the outer surface of the front optical element.

13. A combined base range finder and Albada type viewfinder unit as claimed in claim 1 including an intermediate block of glass connecting said front and rear optical elements; a second glass block united to and extending laterally from said intermediate block and provided with said fully reflecting mirrored surface; the rays forming the indirect image passing through said second glass block into said intermediate block.

14. A combined base range finder and Albada type viewfinder unit as claimed in claim 1, in which the non-mirrored gap area in the concave mirror of the Albada finder is of elongated shape.

15. A combined base range finder and Albada type viewfinder unit as claimed in claim 14, in which the recess is of elliptic shape.

References Cited in the file of this patent
UNITED STATES PATENTS

| | | |
|---|---|---|
| 2,093,299 | Zimmermann | Sept. 14, 1937 |
| 2,187,057 | Sauer | Jan. 16, 1940 |

FOREIGN PATENTS

| | | |
|---|---|---|
| 454,064 | Great Britain | Sept. 23, 1936 |
| 521,491 | Great Britain | May 23, 1940 |
| 905,573 | Germany | Mar. 4, 1954 |